June 9, 1959  J. O. GARRISON  2,890,055
CHUCK
Filed Feb. 13, 1957  2 Sheets-Sheet 1
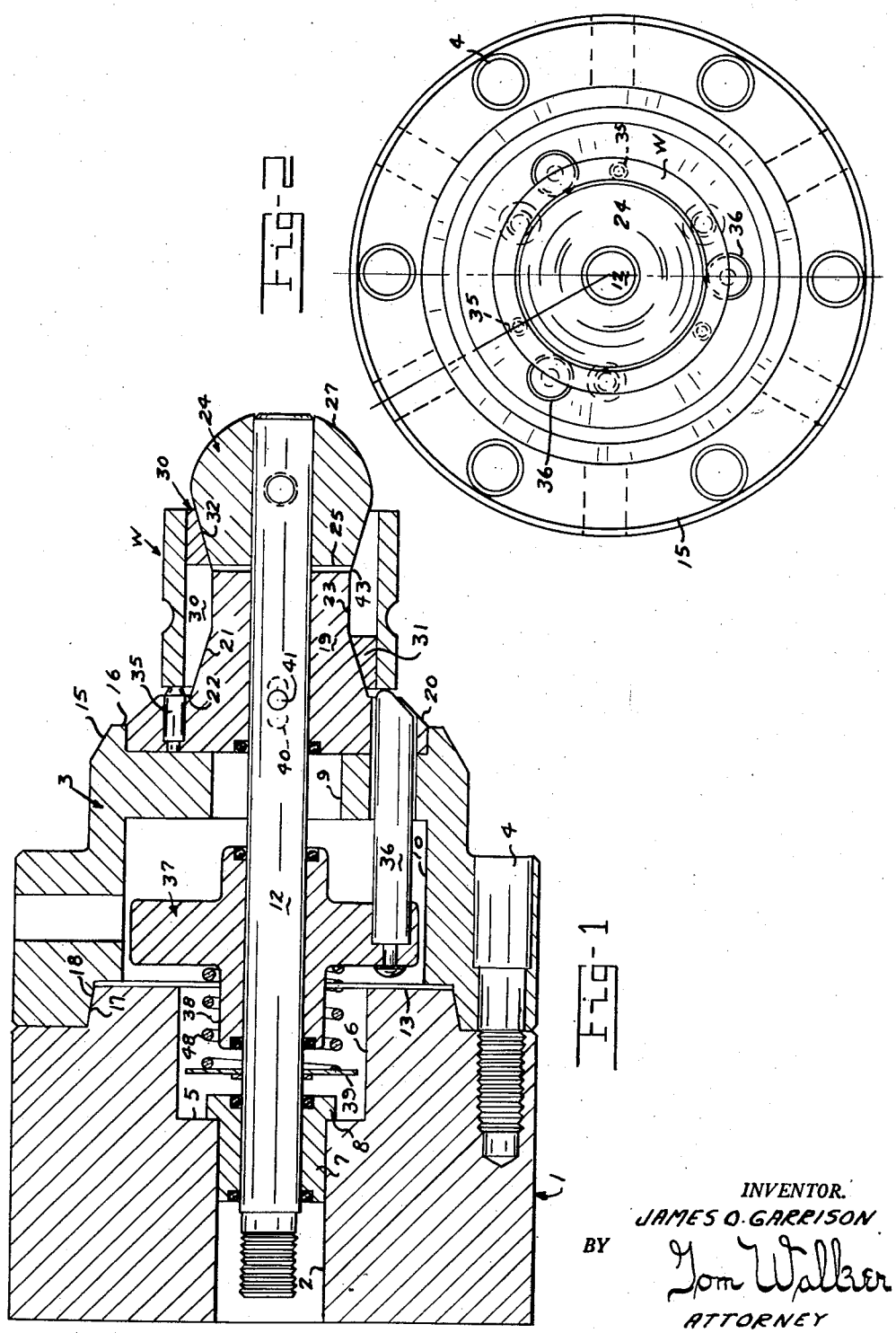
INVENTOR.
JAMES O. GARRISON
BY
Tom Walker
ATTORNEY June 9, 1959 J. O. GARRISON 2,890,055
CHUCK
Filed Feb. 13, 1957 2 Sheets-Sheet 2
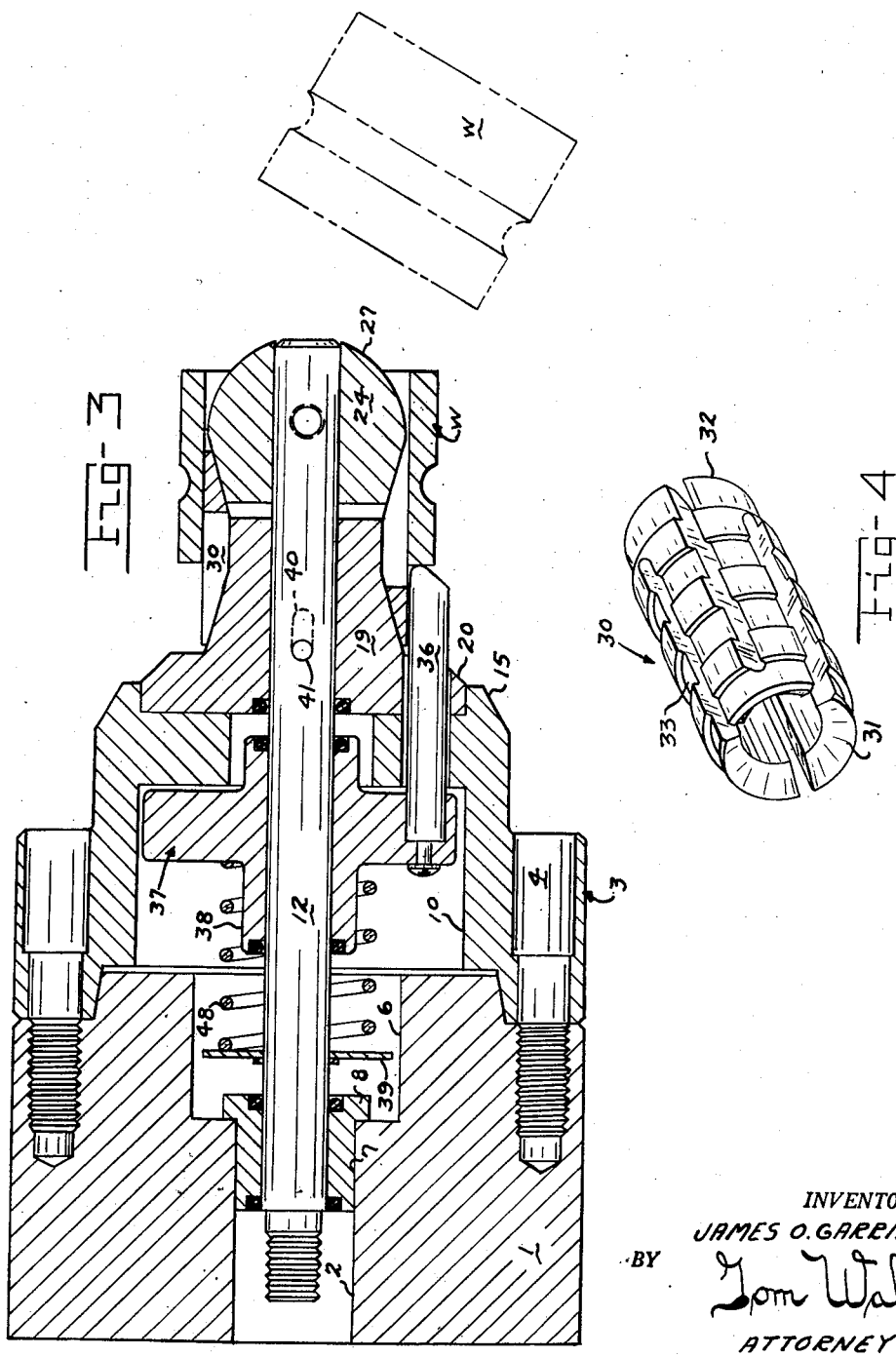
INVENTOR.
JAMES O. GARRISON
BY Tom Walker
ATTORNEY

United States Patent Office 2,890,055
Patented June 9, 1959

2,890,055

CHUCK

James O. Garrison, Dayton, Ohio, assignor to Garrison Machine Works, Inc., Dayton, Ohio, a corporation of Ohio Application February 13, 1957, Serial No. 640,000

12 Claims. (Cl. 279—2)

This invention relates to chucks, and more particularly to collet chucks. It provides improved apparatus for internal, precision chucking of a work piece.

In many instances an element or product of manufacture requires that its external surface be accurately contoured to close dimension. Chucking of such elements has been a problem, particularly where internal chucking is required. Prior devices for internally chucking a work piece have illustrated many problems in the art. One problem that has presented itself is the difficulty in maintaining a true and positive concentricity of the element being worked. Also, the expansion devices required for internal chucking have proven subject to jamming and fatigue due to over-expansion. This results in breakage or deformation of chuck components and a consequently shortened chuck operating life. Torque transmission is also a problem, particularly where the part chucked is heavy.

The present invention is directed to solution of the above indicated problems as well as others in the art. It provides an improved collet type chuck which will internally engage to a work piece to mount it in a firm, concentric manner to a machine spindle, irrespective of size, whereby to enable fine accurate working thereof. The collet so mounts to its base and to the item being chucked that it prevents dirt and other foreign matter from causing inaccuracies which so often occur in the use of conventional chucks. Safety features are provided to absolutely minimize the possibility of collet breakage and to provide positive ejection of the piece worked. Further, torque transmission is at a maximum in the employment of an internal chuck as provided by the invention.

The object of the invention is to simplify the construction as well as the means and mode of operation chucks, whereby such chucks may not only be economically manufactured, but will be more efficient and satisfactory in use, adaptable to a wide variety of applications, and be unlikely to get out of order.

A further object of the invention is to provide an improved collet type chuck for precision chucking.

Another object of the invention is to provide improved means for internally chucking elements for precision working thereof including safety means to prevent jamming of the work to the chuck with consequent damage to the chuck components.

Another object of the invention is to provide means for internally chucking elements to be worked including improved shedder means for positive work ejection.

An additional object of the invention is to provide internal chuck means affording maximum torque transmission to the element chucked thereby, irrespective of its size.

A further object of the invention is to provide a chuck possessing the advantageous structural features, the inherent meritorious characteristics and the mode of operation herein mentioned.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, Fig. 1 shows a cross section of an embodiment of the invention in a chucking condition;

Fig. 2 is a view similar to Fig. 1 illustrating the chuck in an ejecting condition;

Fig. 3 is an end elevation of the device as shown in Fig. 2; and

Fig. 4 is a perspective detailed view of the collet employed in the invention embodiment.

Like parts are indicated by similar characters of reference throughout the several views.

The invention can be best described with reference to the drawings. A machine spindle 1 having a central bore 2 is shown to mount a generally cylindrical chuck body 3 to its end face 13 by means of screws 4. The end abutting portions of the spindle 1 and the chuck housing 3 are respectively conically reduced at 17 and conically recessed at 18 to mate in a male-female fashion so that a firm and tight engagement of the chuck housing to the spindle 1 is effected as the screws are drawn up.

The end abutting face of the spindle is counter bored at 6 to receive a cylindrical bushing 7 press fit within the bore 2 and seating its external flange 8 to the shoulder provided by the counter bore 6. The chuck housing 3 has an axially aligned central bore 9 and is counter bored at 10 at the face abutting the end of the spindle 1. The dimension of the counterbore 10 is larger than that of counterbore 6.

A draw bar 12 extends axially through the bore of the machine spindle 1 and chuck housing 3 and bears in the bushing 7 for reciprocation relative thereto in the process. The draw bar 12 is connected to suitable actuating means for measured reciprocation thereof.

The chuck housing 3 is reduced in external diameter to its outer end which has an annular axial projection 15, conically formed at its periphery.

The cylindrical projection 15 defines a circular recess 16 in the outer end face of chuck body 3. Seated in this recess 16 is a generally tubular collet base 19 which forms an axial extension of the chuck body and is centrally bored to receive draw bar 12 therethrough in bearing relation thereto. The peripheral contour of collet base 19 is such that it is conically reduced at 20 for a short extent immediately forward of its circular base seating in recess 16 and further reduced and conically tapered at 21 to provide a peripheral shoulder 22 between the sections 20 and 21 facing axially outwardly relative chuck body 3. The outer end 23 of collet base 19 is an extension of tapered section 21 and cylindrical in form.

The draw bar 12 projects beyond collet base 19 and its projecting extremity has a collet nose 24 pinned thereabout. The inner end 25 of the collet nose has a diameter substantially the equivalent of the adjacent cylindrical extremity 23 of the collet base. From its inner end 25, the outer surface of the collet nose is conically expanded providing a taper on its end adjacent the collet base conforming to the taper of the conical section 21 of the base but oppositely directed. The outer end 27 of the collet nose element is spherically formed for purposes to be described.

As will be noted with reference to the drawings, the operation of the draw bar is such that in no instance will the collet nose 24 engage to the collet base 19. This will be further described.

A collet 30 is provided which is cylindrical in form, as seen in Figure 4 of the drawings, and internally tapered in opposite directions at its respective extremities 31 and 32. The collet 30 is slotted inwardly of its respective ends substantially the length thereof in alternate fashion equidistantly spaced thereabout. In the example illustrated, the collet is peripherally provided with four circumferential relief rings 33 spaced longitudinally thereof and defining three circumferential chucking bands projecting therebetween. Thus, the collet is slotted to be resilient and expansible and its internal configuration is such that it may be axially applied and slip fit over the collet nose 24 to have its internal taper 31 mate with and seat to taper 21 of the collet base 19 while its tapered end 32 seats to its mating taper on the collet nose. The internal cylindrical surface portion of the collet normally seats about the cylindrical extremity 23 of the collet base. The dimensions of the collet 30 and the respective collet base and collet nose are such that when the elements are in a work receiving position the collet will normally closely seat in contracted condition to the configuration of the collet base and the collet nose.

Three axially disposed rest buttons 35 seat in the collet base 19 to project from shoulder 22 in equidistantly circularly spaced relation.

Three shedder or ejector pins 36 are fixed to a cylindrical head 37 bearingly mounted about draw bar 12 in counter bore 10 of chuck body 3. The ejector head 37 is formed with hub extensions 38 providing an extended bearing of the head on the draw bar. One of the hub extensions 38 projects into counter bore 6 of the machine spindle. A ring collar 39 is fixed about draw bar 12 in counter bore 6 adjacent and spaced from bushing 7. A coil spring 48 about the draw bar 12 seats its respective extremities to collar 39 and about the hub 38 in the counter bore 6 to the ejector head 37 to apply a bias to it tending to move it in a direction outwardly relative chuck body 3 and relative draw bar 12. The ejector pins 36 project through the forward wall of chuck body 3 about bore 9 in circular fashion and in intermediate relation to the rest buttons 35 so they are jointly circularly disposed to project from the outer face of the chuck body in the path of the work piece applied over collet 30.

The draw bar 12 has a cross pin 41 therethrough projecting diametrically therefrom and through diametrically opposed elongated slots 40 in collet base 19. This pin-slot arrangement limits the actual extent of the reciprocal travel of the draw bar in its chucking and ejecting movements.

As may be seen with reference to Fig. 1 of the drawings, a work piece W, such as the inner race of a ball bearing, may be automatically or manually applied to the chuck by axially slipping it over the collet nose 24 when the draw bar 12 is in its forward or projected position relative the collet base 19. The piece W is slipped over collet 30, which is in its contracted position at this point, to engage its inner end to rest buttons 35 and ejector pins 36 to force pins 36 and ejector head 37 inwardly of body 3 to compress ejector spring 40 and thus energize it. This occurs at the same time the operating means provided draws the bar 12 and the collet nose 24 inwardly relative chuck body 3 to provide an axial compression and radial expansion of collet 30 by means of the relatively outward diverging tapers on the collet nose 24 and base 19. Due to the slotting of the collet 30, its peripheral chucking bands will be thus radially expanded into locking engagement with the internal surface of the bearing race W. The operating medium for the draw bar is controlled to limit the inward movement of the collet nose 24 to maintain a minimum clearance 43 between the outer extremity of the collet base 19 and the inner extremity of collet nose 24. This permits positive seating of the work piece to the rest buttons and the ejector pins and prevents over expansion of the collet and freezing of the work piece to the collet thereby.

The symmetry of the tapers on the collet nose and base in conjunction with the symmetry and balanced slotting of the collet results in a locking of the bearing race W in true concentricity with the central axis of the machine spindle 1. The locking bands on the collet 30 provide maximum torque transmission due to the transmission of the forces resulting from the axial and radial compression of the collet effected by the chucking action. Completely accurate machining may be thus effected. The chucking action is so simple and positive that it is particularly good for heavy pieces.

When the piece W is to be ejected, the draw bar 12 is moved forward, limited in travel by cross pin 41. The collet nose 24 moves forward therewith to release the locking pressure of its taper on collet 30, permitting it to radially contract to its normal position.

In the movement of bar 12 the cross pin 41 kicks the inner end of the collet to prevent its sticking to the taper 21 on the collet base and insure collet constraction to its normal position. This releases piece W from its locked position to be ejected by ejector pins 36 under the influence of spring 48, as seen from Figure 3 of the drawings. The ejection is thus positive and automatic on movement of the draw bar forwardly of the chuck body 3. A new piece W may be automatically fed to the chuck immediately while bar 12 is in its forward position and collet 30 is contracted.

It is noted that the conical male-female mounting of the chuck body 3 to the spindle 1 is highly advantageous since it requires accurate machining only of the conical and abutting surfaces at its periphery for insuring true concentric mounting of the chuck body. The central surfaces are not critical and do not need accurate machining to insure proper mating. This conical male-female mounting also enables the chuck body to be drawn up in a firm and secure manner to avoid any deviation from precision working in this respect.

Thus, a very efficient and simply constructed internal chucking device is provided by the invention. It insures quick and positive chucking of a work piece in concentric fashion to the machine spindle for precision working thereof. The control means establishing that the collet nose will not seat to the collet base in the chucking operation enables a firm seating of the work piece without danger of damage to the chucking components. The ejection mechanism operates automatically on forward movement of the draw bar to kick the collet outwardly of the chuck body and positively eject the work piece.

The present disclosure is for descriptive purposes only and the subject matter of this application can be embodied in other structures having specifically different parts. For example, the number of relief rings 33 in the collet 30 can be more or less than the four shown herein, and by the same token it is not necessary that there be three rest buttons 35. More or less rest buttons can be incorporated depending upon the type of work piece being chucked. Likewise the shedder pins 36 can be more or less than the three shown in the present disclosure, again the number being determined by the particular type of work piece being held in the chuck.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. Apparatus for internally chucking a work element including a chuck housing, a draw bar axially adjustable relative thereto, a slotted collet base fixed to said chuck housing and providing a bearing for said draw bar, a collet element fixed to said draw bar for axial adjustment relative said base, an expansible collet normally mounting about said collet base and said collet element and internally contoured to seat thereabout in normal configuration on adjustment of said collet element away from said collet base to receive a work piece thereabout, the adjustment of said draw bar to move said collet element to said base axially compressing said collet to internally lock the work piece to the chuck housing, means automatically controlling the draw bar to maintain a minimum clearance between said collet base and element on chucking a work piece to prevent jamming or breakage of the collet, and pin means connected to said draw bar and projecting through the slotted portion of said base to kick said collet free from said base on axial adjustment of said bar from its chucking position to prevent malfunction due to sticking or jamming of said collet.

2. Apparatus for internally chucking a work element including a chuck housing, a draw bar axially adjustable relative thereto, a formed collet base fixed to said chuck housing and providing a bearing for said draw bar, a formed collet element fixed to said draw bar for axial adjustment relative said base, an expansible collet mounting about said collet base and said collet element and internally contoured to seat thereabout in normal configuration on adjustment of said collet element away from said collet base to receive a work piece thereabout, the adjustment of said draw bar to move said collet element to said base axially compressing said collet to a chucking position to internally lock the work piece to the chuck housing, means for establishing a minimum clearance between said collet base and element at all times to prevent jamming or breakage of the collet, and means connected to said draw bar projecting through said base and operative to kick said collet free from said base in response to axial adjustment of said element from its chucking position to prevent malfunction due to sticking or jamming of said collet.

3. An internal chuck comprising, means providing an expansible and contractable sleeve, relatively displaceable base elements mounting said sleeve means in a contracted condition in a work receiving position and operative to expand said sleeve means to internally and uniformly lock to a work piece on relative movement in one direction, means connected with one of said base elements for automatically initiating positive displacement of said sleeve means from its expanded position on relative movement of said base elements in the opposite direction to free the work piece thereby and means for automatically ejecting the work piece substantially simultaneously therewith.

4. An internal chuck comprising, means providing a collet, relatively displaceable generally conical collet base elements mounting said collet in a contracted condition in a work receiving position and operative to expand said sleeve means to internally and uniformly lock to a work piece on relative movement in one direction, means connected with one of said base elements and projecting from the other to automatically initiate displacement of said sleeve means from its expanded position on relative movement of said base elements in the opposite direction and means for ejecting the work piece substantially simultaneously therewith.

5. An internal chuck comprising a collet, relatively displaceable tapered collet base elements mounting said collet in a contracted condition for receiving a work piece thereabout, said collet being generally cylindrical and longitudinally slotted inwardly of either end in alternate equidistantly spaced circumferential fashion to provide resilience thereto and having a plurality of longitudinally spaced locking bands projecting peripherally thereof, and means for displacing said base elements to an immediately adjacent position for locking said collet to the work piece through the medium of said peripheral bands.

6. The structure as set forth in claim 5, said displacing means having an element connected thereto for initiating freeing of said collet from its locked position on displacement of base elements from their immediately adjacent position and further means energized on locking the work piece to said collet automatically ejecting the work piece on said collet being freed from its locked position.

7. An internal chuck comprising a generally cylindrical collet slotted inwardly of the respective ends thereof to provide resilience thereto, a chuck housing having means for concentrically engaging said collet, a draw bar having a collet base element fixed thereto extending axially through said chuck housing and collet and being operable to reciprocate said base element to and from said chuck housing for expansion or contraction of said collet, automatic work ejector means mounted to said chuck housing, and automatic operating collet ejector means connected to said draw bar.

8. A chuck collet comprising a generally tubular body, said body being slotted inwardly of its respective ends in alternating fashion, and the periphery of said body having uniform circumferentially projecting, longitudinally spaced locking bands interrupted by the slots therein.

9. Internal chuck apparatus including a first fixed collet base element conically reduced to one end, a second relatively displaceable collet base element cooperable therewith, said second base element being conically expanded to a spherical end portion, a generally tubular body slotted inwardly of its respective ends in circumferentially spaced fashion mounted about the conical portions of said base elements and having its internal surface tapered to mate therewith whereby said base elements may be relatively displaced to expand said body, and longitudinally spaced band means projecting peripherally of said tubular body for locking a work piece thereto on expansion thereof.

10. A chuck comprising a chuck body having a central bore, a central recess in the outer face of said chuck body, a draw bar bearing in said bore and projecting axially of said outer face, a collet base seated in the recess in said body to project axially thereof about said draw bar, said base being tapered from immediately adjacent said body and provided with a reduced cylindrical extremity, a collet nose fixed to said draw bar providing a similar taper as said base but in reverse direction, a collet mounting about the tapered portions of said base and said nose and responsive to relative movement thereof on actuation of said draw bar to selectively expand or effect its normal configuration and longitudinally spaced band means projecting peripherally from said collet for locking a work piece to said chuck body on expansion of said collet.

11. The structure as set forth in claim 10 and means for automatically limiting the relative displacement of said collet base and nose and maintaining a minimum clearance therebetween at all times.

12. The structure as set forth in claim 11 and means energized on locking of a work piece to said chuck body for automatically ejecting said work piece on movement of said draw bar to effect a normal configuration of said collet.

References Cited in the file of this patent

UNITED STATES PATENTS

| | | |
|---|---|---|
| 1,931,328 | Searles | Oct. 17, 1933 |
| 2,690,914 | Bryant et al. | Oct. 5, 1954 |
| 2,732,213 | Drew | Jan. 24, 1956 |
| 2,739,818 | Benjamin et al. | Mar. 27, 1956 |
| 2,789,825 | Drew | Apr. 23, 1957 |
| 2,817,532 | Hohwart et al. | Dec. 24, 1957 |